_Patented Mar. 16, 1948_ 2,438,096

UNITED STATES PATENT OFFICE 2,438,096

STABILIZATION OF ROSIN SIZES

Edward N. Poor, Stamford, and Kenneth L. Howard, Old Greenwich, Conn., assignors to American Cyanamid Company, New York, N. Y., a corporation of Maine No Drawing. Application August 21, 1945, Serial No. 611,914

4 Claims. (Cl. 106—238)

This invention relates to the stabilization of liquid rosin size compositions against crystallization, and to the stabilized rosin size compositions so obtained. The invention has as a principal object the prevention of the formation of crystals in liquid rosin size compositions of the type obtained by saponifying rosin with solutions of alkalies such as sodium carbonate.

Liquid rosin size compositions are usually prepared by saponifying wood or gum rosin with sodium carbonate solutions. Ordinarily about 9-14% of sodium carbonate, based on the weight of the rosin, is used for the saponification. When larger proportions of sodium carbonate on the order of 13-14% are employed most of the rosin is saponified, and the product is known as a low free rosin size. When smaller quantities of sodium carbonate on the order of 9-10% are used a substantial proportion of the rosin remains unsaponified and the product is known as a high free rosin size.

Liquid rosin size solutions prepared in the above-described manner are usually shipped to the customer in tank cars and are kept by the paper mills in large storage tanks, where they may remain for some time before use. Crystallization which sometimes occurs in these storage tanks is very objectionable, for it causes a serious loss in the rosin size and also plugs up pipe lines and causes stoppages in paper manufacture.

Although rosin sizes prepared from various types of rosin, including both gum rosin and wood rosin, have been known to crystallize, the most serious crystallization difficulties occur when wood rosin is used. Analysis of the crystals obtained from both wood rosin and gum rosin sizes shows that they consist of a double salt of abietic acid and sodium abietate having the approximate composition of 3 mols of abietic acid for one mol of sodium abietate. These crystals form most readily in the high free rosin sizes, although they have been known to form in liquid sizes containing only small proportions of unsaponified rosin.

In U. S. Patent No. 2,309,346, dated January 26, 1943, the problem of crystal formation in liquid rosin size compositions is discussed and it is shown that formaldehyde and water-soluble formaldehyde condensation products are useful inhibitors to prevent crystallization. Our present invention is directed to improvements in the formaldehyde type of crystallization inhibitors described in this patent.

Formaldehyde has been used to stabilize large quantities of liquid rosin size during the past three years, and has proven to be an excellent inhibitor of crystallization. For most liquid size compositions an adequate control of crystal formation is obtained by incorporating about 2% of 37% aqueous formaldehyde solution into the size at the time of its preparation. However with some sizes, and particularly with high free rosin sizes prepared from wood rosin, crystallization difficulties are still encountered. Although it might be possible to correct this difficulty by adding more formaldehyde, such treatment is not commercially feasible for a number of reasons. Chief among these is the fact that the rosin size will darken the paper if it contains too much formaldehyde, and for this reason more than 3% of the formaldehyde solution cannot ordinarily be used.

Our present invention is based on the discovery that improved stabilization of liquid rosin sizes against crystal formation is obtained when an amine is added to the size along with the formaldehyde stabilizer discussed above. Although the amines themselves possess only slight crystallization inhibiting properties, we find that they will cooperate with formaldehyde to produce greatly improved anti-crystallizing properties, as compared with formaldehyde itself. Moreover, the amines do not darken the color of paper made with rosin sizes and therefore the replacement of a part of the formaldehyde by the amine will produce stabilized liquid rosin size compositions having good color characteristics. Our invention in its broader aspects therefore includes liquid rosin size compositions stabilized against crystallization by the incorporation therein of stabilizing amounts of a crystallization inhibitor containing both formaldehyde and an amine, these being relatively small amounts that do not noticeably discolor paper containing the rosin size.

In practicing our invention we greatly prefer the aliphatic primary and secondary amines. Best results have been obtained with the water-soluble amines such as methylamine, monoethanolamine, diethanolamine, diamylamine and the like, although higher aliphatic amines such as lauryl amine may be employed if desired. Aromatic amines such as aniline and diphenylamine are less active presumably because of their higher molecular weights, and are usually employed in relatively larger quantities. Cyclic amines such as morpholine have also been used to advantage.

In most cases the presence of an amine such as those described above will permit a 50% reduction in the amount of formaldehyde that would ordinarily be used to obtain adequate stabilization against crystal formation. When used for this purpose the aliphatic and cycloaliphatic amines are employed in amounts of about 0.2–1.5%, based on the weight of the rosin used in preparing the size; about twice as much of the aromatic amines are ordinarily employed. Stabilizing amounts of the crystallization inhibitors of our invention are therefore about 0.2 up to about 2.0% of formaldehyde solution together with about an equal quantity of aliphatic or cycloaliphatic amine or a slightly larger quantity of aromatic amine. However we have obtained adequate stabilization of liquid rosin size compositions with not more than 0.5–1% of formaldehyde solution and 0.2–0.7% of aliphatic and cycloaliphatic amines, based on the weight of the rosin, and these amounts constitute the preferred range of stabilizing amounts for use in practicing our invention.

In preparing stabilized liquid rosin size compositions the crystallization inhibitor is preferably added after the rosin is melted, and may be incorporated before or after the liquid rosin size solution is prepared. However, the invention in its broadest aspects is not limited to any particular method of incorporation, and other methods of adding the crystallization inhibitor may be used if desired.

The invention will be illustrated in detail by the following specific example, which describes the results obtained with varying quantities of representative amines, both alone and with formaldehyde. It should be understood, however, that these results are illustrative of a wide variety of amines that could be substituted for those actually employed without materially altering the results obtained.

*Example*

The following is a standard method of preparing liquid rosin size compositions for evaluation. All the results described below were obtained with sizes prepared in accordance with this procedure. 500 parts by weight of N-wood rosin (optical rotation plus 10.3°) were weighed into a container which was heated to 105–115° C. A hot sodium carbonate solution containing 9% of soda ash, calculated on the basis of the solid rosin, in 225 parts by weight of water was heated to boiling and poured on the rosin. The mixture was maintained at 105–115° C. for several hours, or until the alkali had been completely reacted, during which time 50 parts of hot water were added every half hour. Upon completion of the reaction the product is diluted with hot water to 70% solids, and is tested at this concentration. The inhibitor was added shortly after the rosin was melted.

Experience has shown that an inhibitor which in a high free rosin size solution prepared from 9% of sodium carbonate is effective to retard crystallization for a period of 5–10 days at 70° C. will give good results in commercial practice at ordinary temperatures with either high free rosin or low free rosin sizes. Accordingly, the effectiveness of the crystallization inhibitor can be evaluated directly from the results given in the following table. In this table the amounts of amine and formaldehyde added are based on the weight of the rosin used; the composition was incubated at 70° C. until the first appearance of abietic acid-sodium abietate double salt crystallization, and the number of days is given in the appropriate column. In some cases the incubation was stopped after 40 or 50 days when it was apparent either that no crystal formation or only a small quantity of crystals was to be expected. In the other samples, where crystallization developed rapidly after the first crystal, the separation of approximately half of the suspended rosin size as crystals was arbitrarily chosen as the end point.

| 37% Formalin, Per Cent | Amine | Per Cent | First Crystal, Days | 50% Crystals, Days |
|---|---|---|---|---|
| 2 | None | | 7 | 15 |
| 3 | do | | 15 | |
| 4 | do | | 24 | |
| 5 | do | | (1) | |
| 1 | Methylamine | 0.4 | 40 | |
| 1 | Monoethanolamine | 0.2 | 40 | |
| 0.5 | do | 0.4 | 19 | 23 |
| 1 | do | 0.4 | 50 | |
| 1.5 | do | 1.2 | (2) | |
| None | do | 3.0 | 17 | 19 |
| 1 | Diethanolamine | 0.4 | 50 | |
| 1 | do | 1.2 | 45 | |
| 1.4 | do | 1.5 | (2) | |
| None | do | 3.0 | 14 | 16 |
| 1 | Triethanolamine | 0.5 | 40 | |
| 1 | Diamylamine | 1.1 | 67 | |
| 1 | Morpholine | 1.1 | 67 | |
| 1 | Aniline | 1.1 | 26 | 30 |
| 1 | Diphenylamine | 2.3 | 67 | |

[1] No crystals after 60 days' incubation.
[2] No crystals after 50 days' incubation.

What we claim is:

1. A method of stabilizing aqueous liquid rosin size solutions against crystallization which comprises incorporating therein stabilizing amounts of a crystallization inhibitor comprising a mixture of approximately equal quantities of formaldehyde and an amine.

2. A method of stabilizing aqueous liquid rosin size solutions against crystallization which comprises incorporating therein stabilizing amounts of a crystallization inhibitor comprising a mixture of approximately equal quantities of formaldehyde and an aliphatic amine.

3. An aqueous liquid rosin size composition stabilized against crystallization by the incorporation therein of stabilizing amounts of a crystallization inhibitor comprising a mixture of approximately equal quantities of formaldehyde and an amine.

4. An aqueous liquid rosin size composition stabilized against crystallization by the incorporation therein of stabilizing amounts of a crystallization inhibitor comprising a mixture of approximately equal quantities of formaldehyde and an aliphatic amine.

EDWARD N. POOR.
KENNETH L. HOWARD.

REFERENCES CITED

The following references are of record in the file of this patent:

UNITED STATES PATENTS

| Number | Name | Date |
|---|---|---|
| 2,309,346 | Landes et al. | Jan. 26, 1943 |

OTHER REFERENCES

Formaldehyde by Walker. Reinhold Publishing Co., 1944, pages 199 and 200.